(12) United States Patent
Li (10) Patent No.: US 7,832,898 B2
(45) Date of Patent: Nov. 16, 2010

(54) ENVIRONMENTALLY FRIENDLY STREET LAMPS

(75) Inventor: Xuliang Li, Dongguan (CN)

(73) Assignee: Dongguan Kingsun Optoelectronic Co., Ltd, Hengjiangxia Village, Changping Town, Dongguan (CN)

( * ) Notice: Subject to any disclaimer, the term of this patent is extended or adjusted under 35 U.S.C. 154(b) by 223 days.

(21) Appl. No.: 12/182,153

(22) Filed: Jul. 30, 2008

(65) Prior Publication Data

US 2009/0034255 A1 Feb. 5, 2009

(30) Foreign Application Priority Data

Jul. 31, 2007 (CN) .................... 2007 1 0075377

(51) Int. Cl.
*F21S 4/00* (2006.01)

(52) U.S. Cl. .................. 362/249.02; 362/240; 362/294; 362/431

(58) Field of Classification Search .................. 362/431, 362/240, 249.02, 249.03, 249.04, 249.05, 362/249.06, 294, 373
See application file for complete search history.

(56) References Cited

U.S. PATENT DOCUMENTS

| 7,237,936 | B1 * | 7/2007 | Gibson | 362/547 |
| 7,303,309 | B2 * | 12/2007 | Wu et al. | 362/240 |
| 7,695,163 | B2 * | 4/2010 | Yamada et al. | 362/294 |

* cited by examiner

*Primary Examiner*—Stephen F Husar (57) ABSTRACT

The present invention relates to a LED street lamp, and more particularly to environmentally friendly LED street lamp. The LED street lamp comprises a main body and a plurality of LED bulbs, wherein the main body comprises a base plate; said base plate comprises two splay flat plate, namely the $1^{st}$ flat plate and the $2^{nd}$ plate; the inner side of the $1^{st}$ flat plate and the $2^{nd}$ flat plate comprise sunk cavities where the LED bulbs are provided; and the light beams from the LED bulbs at the $1^{st}$ flat plate and the $2^{nd}$ plate cross in front of the main body.

7 Claims, 6 Drawing Sheets

ENVIRONMENTALLY FRIENDLY STREET LAMPS

FIELD OF THE INVENTION

The present invention relates to a LED street lamp, and more particularly to an environmentally friendly LED street lamp.

BACKGROUND OF THE INVENTION

The ordinary street lamp, e.g. high pressure sodium lamp, is constructed by mounting a reflection shade behind the bulb. The reflection shade is a convex shade reflecting the unordered light. The light coming out of this kind of bulbs cannot focus, not only the light shinning out, but also the light reflected from the shade disperse. Some of the dispersing light shin in people's eyes directly and cause vertigo, this is so-called light pollution.

LED street lamp has good chroma, and needs no maintenance with a long service life. Although the LED bulbs focus well, they cannot mount vertical to the earth in reality, because this will leads to small radiation area. However, if the LED bulbs are mounted aslant to the earth, it will cause light pollution just like ordinary street lamps and limit popularization of LED street lamps.

SUMMARY OF THE INVENTION

The intent of this invention is to provide an environmental friendly LED street lamp without light pollution for overcoming the aforementioned disadvantage.

The present invention can be achieved by following technical solutions: An environmental friendly LED street lamp comprises a main body and a plurality of LED bulbs, wherein the main body comprises a base plate; said base plate comprises splay flat plates, namely the $1^{st}$ flat plate and the $2^{nd}$ plate; the inner side of the $1^{st}$ flat plate and the $2^{nd}$ flat plate comprise sunk cavities where the LED bulbs are provided; and the light beams from the LED bulbs at the $1^{st}$ flat plate and the $2^{nd}$ plate cross in front of the main body.

An environmental friendly LED street lamp, wherein said main body comprises a head portion, a middle portion and a tail portion; the head portion and one side of the middle portion are connected butt and butt, and the opposite side of the middle portion and the tail portion are connected the same; there is a gasket provided between the head portion and the middle portion, and the head portion and the middle portion are secured by fasteners; there is a gasket provided between the tail portion and the middle portion, and the tail portion and the middle portion are secured by fasteners; the middle portion is profile with same section along its length direction; said profile comprises a base plate which consists of two flat plates and connecting plate between them; the two flat plates are splay and are connected by the connecting plate; the base plate extends along the length direction of the profile with its inner face as the obverse face and the outer face as the inverse; two parallel side plates extending along the length direction of the profile are provided at the two edges of the obverse face symmetrically, while the inverse is provided with a plurality of radiating pins extending along the length direction of the profile; a tube of the head portion is constructed by a top part and a bottom part, which are secured by fasteners; a wire hole in the head portion connects the tube and the joint face of head portion and the middle portion; the LED street lamp further comprises two radiating plates on the obverse face of the splay flat plates separately; the radiating plates comprises PCB for conductivity; and a plurality of LED bulbs are provided at the radiating plates to form LED array plates; the LED street lamp further comprises two insulating gaskets adhering to the radiating plates; and a plurality of holes are provided at the insulating gaskets for the LED bulbs; the insulating gaskets and the radiating plates are fastened to the obverse face of the base plate of the middle portion by fasteners; the two inner sides of the splay flat plate are both provided with a set of radiating plate and insulating gasket; LED street lamp further comprises a reflection shade adhering to the insulating gaskets; the reflection shade comprises a plurality of reflection notches with corresponding holes at the bottom of the reflection notches for the LED bulbs; the LED bulbs are set in the reflection notches through the holes at the bottom of the reflection notches; the reflection shade is secured to the obverse face of the middle portion by fasteners; the reflection notches are provided in couple to shape like splay, and this construction corresponds to the splay base plate; the LED street lamp further comprise lampshade comprising bottom plate and transparent lampshade, wherein the bottom plate is a rectangular plate with a rectangular hatch; a rectangular gasket and a rectangular frame are provided in order to fix the lampshade plate to the bottom plate by fasteners; the head portion, the middle portion, the tail portion and the bottom plate are all made of thermal conductive material; and the wire hole is provided with a waterproof tie-in.

An environmental friendly LED street lamp, wherein the obverse side of the middle portion further comprises a couple of hook portion with their tips setting face to face, and each of the hook portion is set near the side plate; the section of the hook portion shaping like letter "L" comprises a horizontal part and a vertical part, wherein the horizontal part is longer than the vertical part; the head portion comprises a joint face comprising a step, wherein the convex part of the step butts into the inner side of the splay side plates of the middle portion, and the gasket is provided at the outer side of the step; similarly, the tail portion comprises a joint face comprising a step, wherein the convex part of the step butts into the inner side of the splay side plates of the middle portion, and the gasket is provided at the outer side of the step; a plurality of radiating pins are set both on the top part of the head portion and the tail portion; besides, the top part of the head portion and the tail portion are also provided with risers which have holes in them; the head portion and the tail portion are tightened by bolts which are set in the holes of the risers; the middle portion is connected to the head portion and tail portion with gaskets between them; the bolts are arranged in the clearance of the radiating pins on the top of the middle portion; the head portion and the middle portion are tightened by two screws which are set at the two side face of the side plates; similarly, the tail portion and the middle portion are tightened by two screws which are set at the two side faces of the side plates; there is an antiskid on the inner wall of the tube of the head portion 101 axially; the notch in the middle portion is consist of $1^{st}$ face, $2^{nd}$ face and $3^{rd}$ face, wherein the $1^{st}$ face is parallel to $3^{rd}$ face, and the $2^{nd}$ face is vertical to the $1^{st}$ face; the $1^{st}$ face is near the inner side of the side plate, while the $3^{rd}$ face is near the outer side of the side plate; the substantial part between the notch and the inner side of the side plate is $1^{st}$ flange, while the part between the notch and the outer side of the side plate is $2^{nd}$ flange; the bottom face of the $1^{st}$ flange is $4^{th}$ face, and the bottom face of the $2^{nd}$ flange is $5^{th}$ face; both of them are parallel to the $2^{nd}$ face, and the distance between the $4^{th}$ face and the $2^{nd}$ face is shorter than the distance between the $5^{th}$ face and the $2^{nd}$ face; the radiating pins of the head portion, the middle portion and the tail portion are in the same direction with same section; the part of the radiating pins of the head portion away from the middle portion is vaulted; similarly, the part of the radiating pins of the tail portion away from the middle portion is vaulted too.

An environmental friendly LED street lamp, wherein: LED array plates is composed of a plurality of LED subarray plates; each LED subarray plates is provided with a set of LED bulbs, and each LED subarray plate is connected to the obverse face of the base plate of the middle portion by fasteners.

An environmental friendly LED street lamp, wherein the LED street lamp further comprises a constant current power, which is set in the cavity formed by the main body and lampshade; the constant current power is set near the head portion including several sets of constant current devices which can work separately; and each set of constant current device connects its output to the corresponding LED subarray by wire, and all sets of constant current device have one input connecting to the power supply.

An environmental friendly LED street lamp, wherein the head portion and the tail portion are tightened by screws set in the clearance of the radiating pings.

An environmental friendly LED street lamp, wherein the head portion and the tail portion is die-casting molded with aluminum alloy, the middle portion is aluminum profile or aluminum alloy profile; the gaskets at the both sides of the middle portion, and the gasket between the lampshade and the main body are all made of heat conductive silicon gel.

An environmental friendly LED street lamp, wherein the surfaces of the radiating pins are provided with a plurality of raised radiating arris.

The intent of this invention can also be achieved by following technical solution: An environmental friendly LED street lamp comprises a main body and a plurality of LED bulbs, wherein the main body comprises a base plate; said base plate is assembled by a plurality of flat plates to shape like regular polygonal pyramid by cutting out pyramid apex; and each face of the regular polygonal pyramid is a flat plate, and a plurality of LED bulbs are provided on the inner side of the flat plate; the light beams from the bulbs cross in front of the main body.

The intent of this invention can also be achieved by following technical solution: An environmental friendly LED street lamp comprises a main body and a plurality of LED bulbs, wherein the main body comprises a base plate shaping like beach umbrella; and a plurality of LED bulbs are provided on the inner side of the base plate; the light beams from the bulbs cross in front of the main body.

The invention relates to three solutions under one inventive conception, all of them character in the feature of light beams crossing in front of the main body, hence they are filled in one application. The aforementioned light beams crossing in front of the main body is a further restriction of mounting position and mounting angle of LED bulbs for easy understanding. The environmental friendly LED street lamp in this invention relates to LED bulb with great focusing capability, thus the main body use splay plates or regular polygonal pyramid structure or beach umbrella structure in order to cross the light beams in front of the main body. This structure increases radiation area efficiently on one hand, on the other hand it keeps out the faint unordered light from LED bulbs due to the opposite LED bulbs. There is no light pollution for any unordered light shines in people's eyes if people's eyes do not stare at the LED street lamp directly in the radiation area.

DETAILED DESCRIPTION OF THE INVENTION

Figure 1:
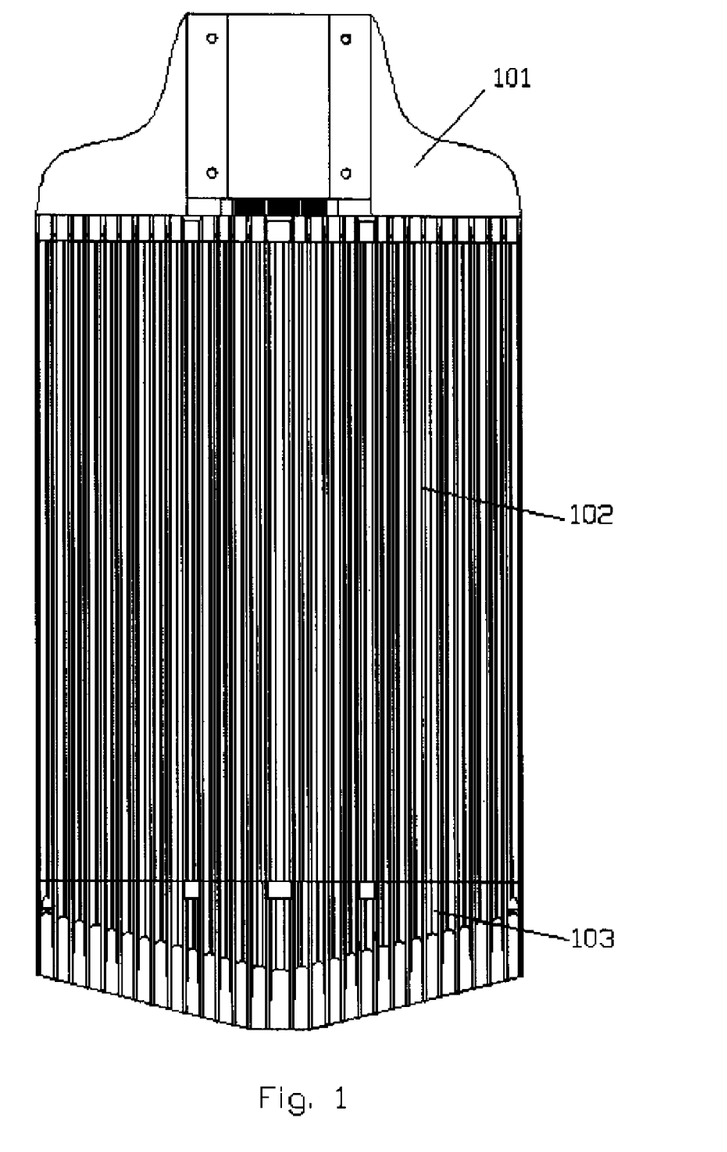
FIG. 1 is a top view of $1^{st}$ embodiment of the invention.
Figure 2:
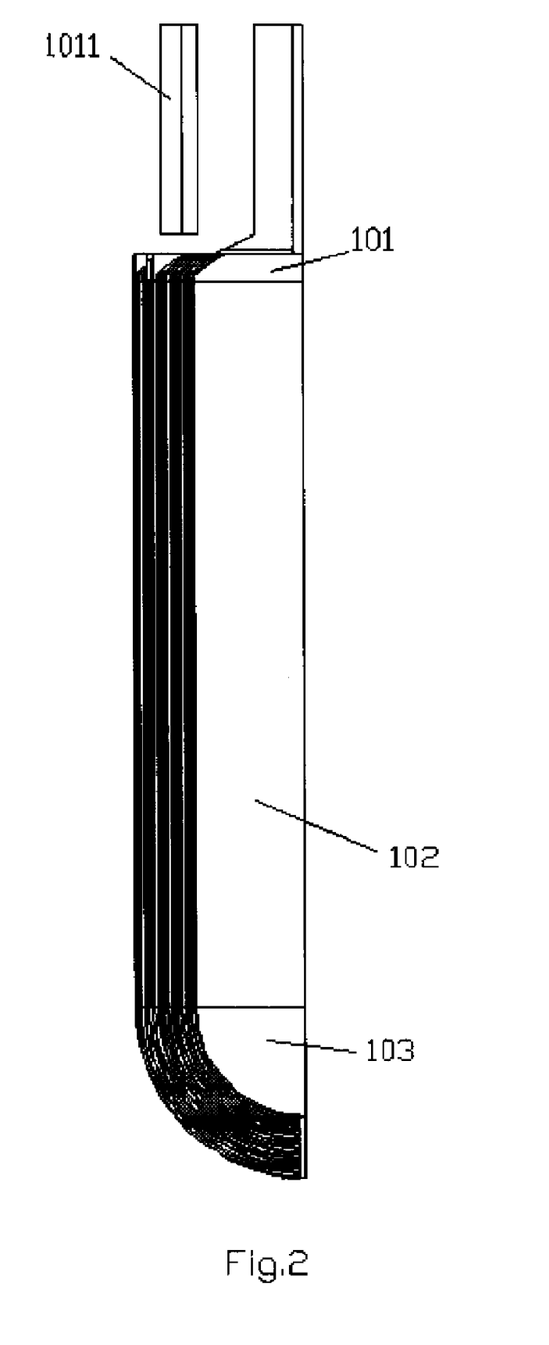
FIG. 2 is a side view of $1^{st}$ embodiment of the invention.
Figure 3:
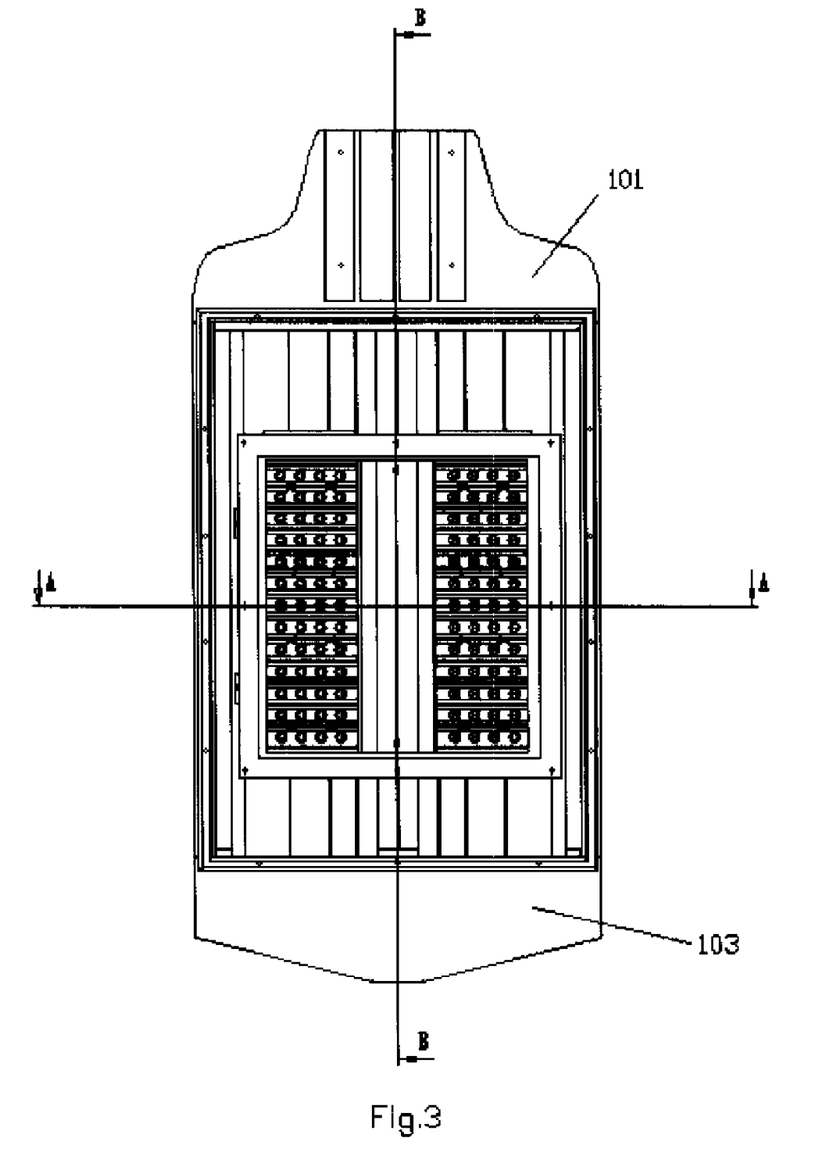
FIG. 3 is a bottom view of $1^{st}$ embodiment of the invention.
Figure 4:
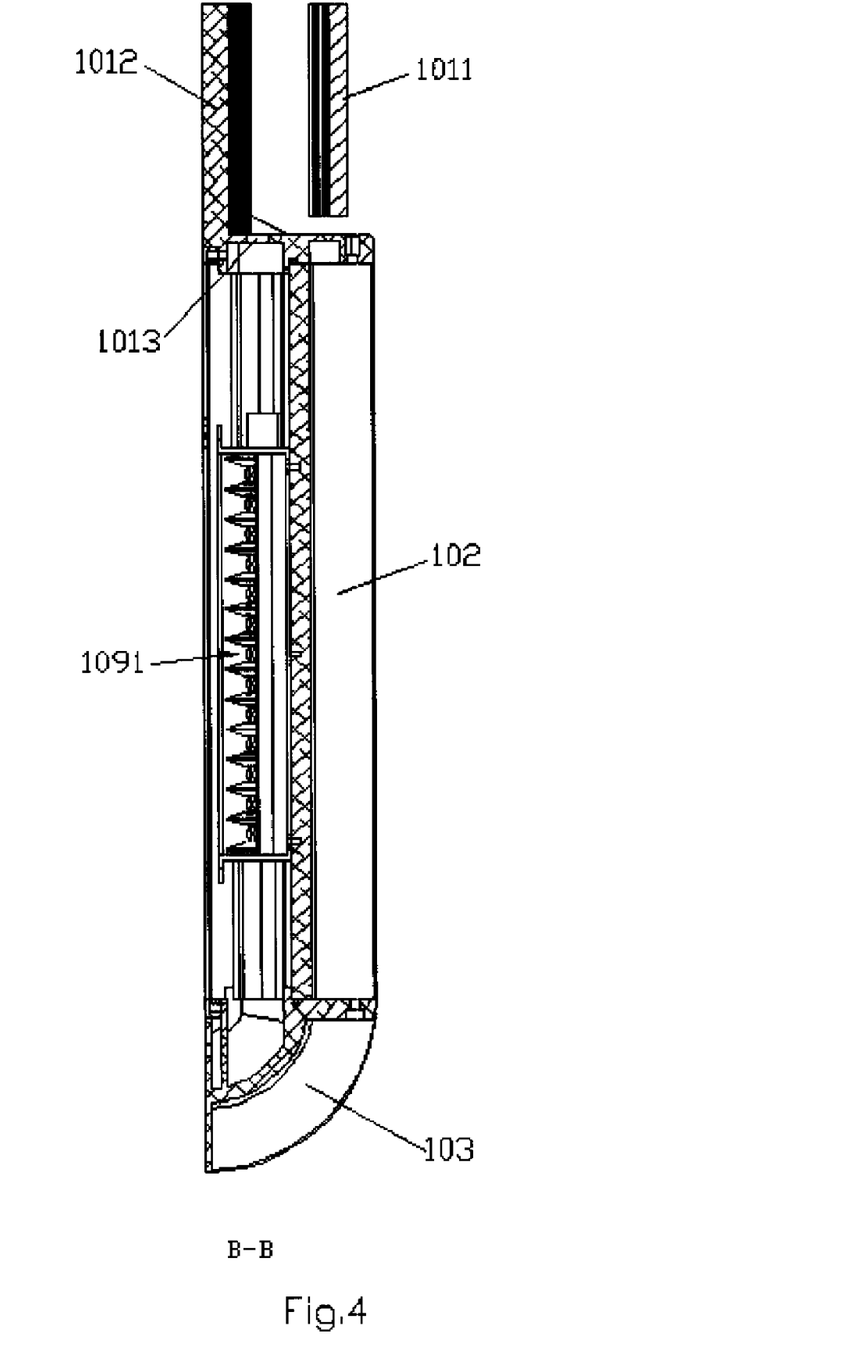
FIG. 4 is a sectional view of B-B in FIG. 3.
Figure 5:
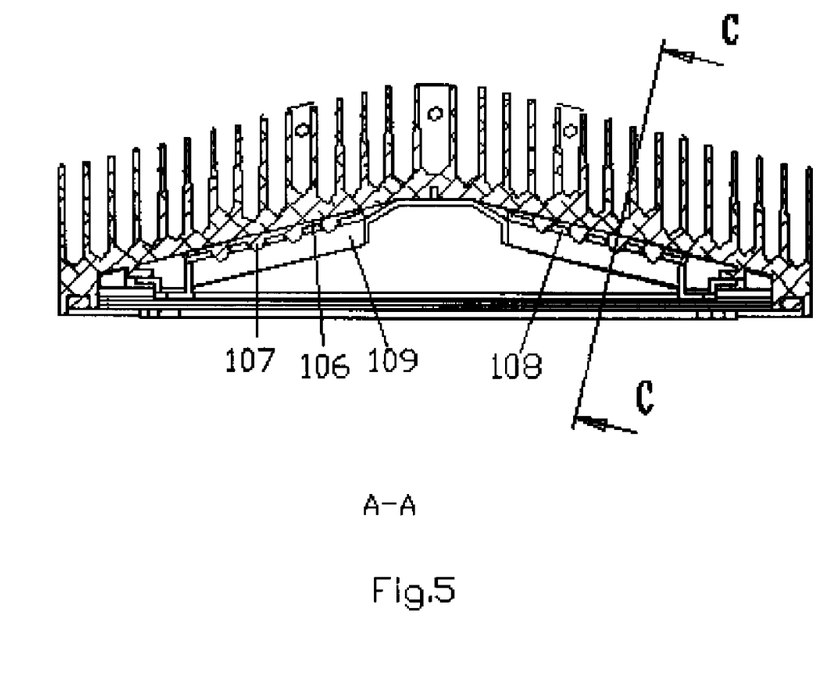
FIG. 5 is a sectional view of A-A in FIG. 3.
Figure 6:
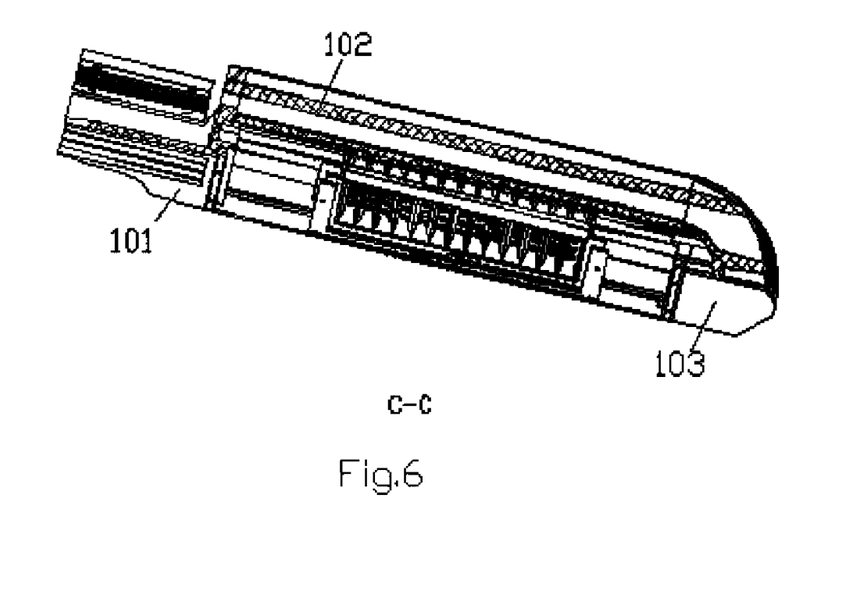
FIG. 6 is a sectional view of C-C in FIG. 5.
Figure 7:
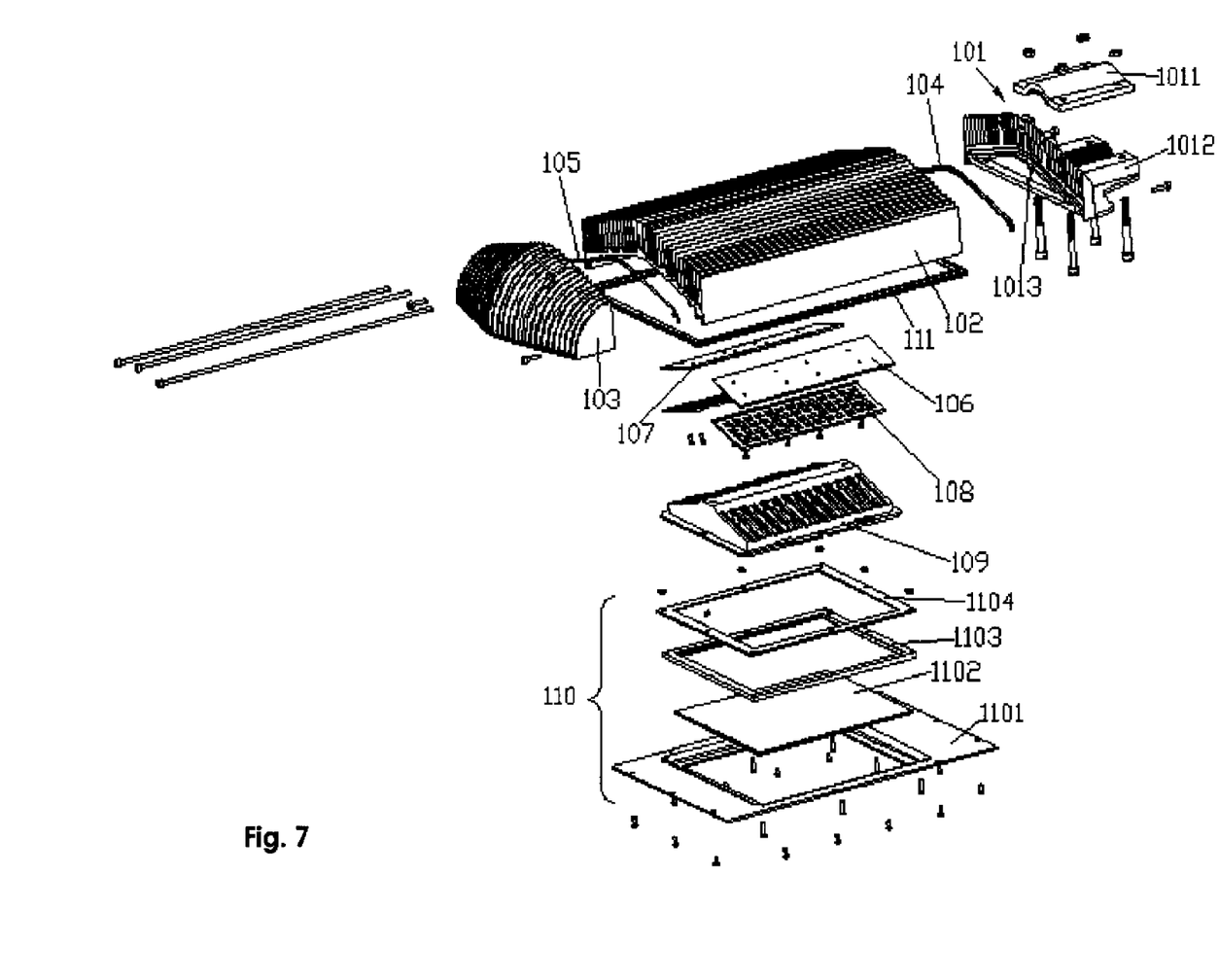
FIG. 7 is an exploded perspective view of $1^{st}$ embodiment of the invention.

A first embodiment of the invention is an environmentally friendly LED street lamp. Referring to FIGS. 1-7, the LED street lamp comprises a LED bulb 107 and main body which is comprised of a head portion 101, a middle portion 102 and a tail portion 103. The head portion 101 and one side of the middle portion 102 are connected butt and butt, and the opposite side of the middle portion 102 and the tail portion 103 are connected the same. A gasket 104 is provided between the head portion 101 and the middle portion 102, and the head portion 101 and the middle portion 102 are secured by screws. A gasket 105 is provided between the tail portion 103 and the middle portion 102, and the tail portion 103 and the middle portion 102 are secured by screws. The middle portion 102 is profile with same section along its length direction. The profile comprises a base plate which consists of two flat plates and connecting plate between them. The two flat plates shapes together to be splay and are connected by the connecting plate. The base plate extends along the length direction of the profile with its inner face as the obverse face and the outer face as the inverse. Two parallel side plates extending along the length direction of the profile are provided at the two edges of the obverse face symmetrically, while the inverse is provided with a plurality of radiating pins extending along the length direction of the profile. A tube of the head portion 101 is constructed by a top part 1011 and a bottom part 1102, which are secured by screws. A wire hole 1013 in the head portion 101 connects tube and the joint face of head portion 101 and the middle portion 102.

The LED street lamp further comprises two radiating plates 106 providing on the obverse face of the splay flat plates separately. The radiating plates 106 comprise PCB for conductivity. A plurality of LED bulbs are provided at the radiating plates 106 to form LED array plates. The LED street lamp further comprises two insulating gaskets 108 adhering to the radiating plates 106. A plurality of holes are provided at the insulating gaskets for the LED bulbs 107. The insulating gaskets 108 and the radiating plates 106 are fastened to the obverse face of the base plate of the middle portion 102 by screws. The two inner sides of the splay flat plate are both provided with a set of radiating plate 106 and insulating gasket 108. LED street lamp further comprises a reflection shade 109 adhering to the insulating gaskets. The reflection shade 109 comprises a plurality of reflection notches 1091 with corresponding holes at the bottom of the reflection notches 1091 for the LED bulbs 107. LED bulbs 107 are set in the reflection notches 1091 through the holes at the bottom of the reflection notches 1091. The reflection shade 109 is secured to the obverse face of the middle portion 102 by screws. In this embodiment, the section of the reflection notches is isosceles trapezoid with its bottom as the shorter side of the isosceles trapezoid. The reflection notches are provided in couple to shape like splay, and this construction corresponds to the splay base plate.

The LED street lamp further include lampshade 110 comprising bottom plate 1101 and transparent lampshade 1102, wherein the bottom plate 1101 is a rectangular plate with a rectangular hatch. In this embodiment, the bottom plate 1101 is made of aluminum for good thermal conductivity, and there is a step at the edge of the hatch opposite to the main body in order to contain the transparent lampshade 1102. A rectangular gasket 1103 and a rectangular frame 1104 are provided in order to fix the lampshade plate 1102 to the bottom plate 1101 by screws. The bottom plate 1101 and the main body are fixed together with a gasket 111 between them by screws. In this embodiment, the head portion 101, the middle portion 102 and the tail portion 103 are all made of aluminum for good thermal conductivity, wherein the head portion 101 and the tail portion 103 are molded by die-casting, while the middle portion 102 is aluminum profile. The gaskets at the both sides of the middle portion, the gasket 111 between the lampshade 110 and the main body, and the rectangular gasket 1103 are all made of heat conductive silicon gel. The insulating gaskets 108 and the radiating plates 106 are fixed to the obverse face of the base plate by screws, each set of insulating gasket 108 and the radiating plate 106 is arranged to fix to one inner side of the splay flat plate. The obverse side of the middle portion 102 further comprises a couple of hook portion with their tips setting face to face, and each hook portion is set near the side plates separately. The section of the hook portion shape like letter "L", hence the hook portion comprises a horizontal part and a vertical part, wherein the horizontal part is longer than the vertical part. The head portion 101 comprises a joint face comprising a step, wherein the convex part of the step butt into the inner side of the splay side plates of the middle portion 102, and the gasket 104 is provided at the outer side of the step. Similarly, the tail portion 103 comprises a joint face comprising a step, wherein the convex part of the step butt into the inner side of the splay side plates of the middle portion 102, and the gasket 105 is provided at the outer side of the step. A plurality of radiating pins are set both on the top part of the head portion 101 and the tail portion 103. Besides the top part of the head portion and the tail portion are also provided with risers which have holes in them. The head portion 101 and the tail portion 103 are tightened by bolts which are set in the holes of the risers. The middle portion 102 is connected to the head portion 101 and tail portion 103 with gaskets 104 and 105 between them. The bolts are arranged in the clearance of the radiating pins on the top of the middle portion 102. The head portion 101 and the middle portion 102 are tightened by two screws which are set at the two side face of the side plates. Similarly, the tail portion 103 and the middle portion 102 are tightened by two screws which are set at the two side face of the side plates. There is antiskid on the inner wall of the tube of the head portion 101 axially. The notch in the middle portion 102 is consist of $1^{st}$ face, $2^{nd}$ face and $3^{rd}$ face, wherein the $1^{st}$ face is parallel to $3^{rd}$ face, and the $2^{nd}$ face is vertical to the $1^{st}$ face. The $1^{st}$ face is near the inner side of the side plate, while the $3^{rd}$ face is near the outer side of the side plate. The substantial part between the notch and the inner side of the side plate is $1^{st}$ flange, while the part between the notch and the outer side of the side plate is $2^{nd}$ flange. The bottom face of the $1^{st}$ flange is $4^{th}$ face, and the bottom face of the $2^{nd}$ flange is $5^{th}$ face. Both of them are parallel to the $2^{nd}$ face, and the distance between the $4^{th}$ face and the $2^{nd}$ face is shorter than the distance between the $5^{th}$ face and the $2^{nd}$ face. The radiating pins of the head portion 101, the middle portion 102 and the tail portion 103 are in the same direction with same section. The part of the radiating pins of the head portion 101 away from the middle portion 102 is vaulted. Similarly, the part of the radiating pins of the tail portion 103 away from the middle portion 102 is vaulted too. The wire hole 1013 is provided with a waterproof tie-in for keeping dry in the lamp cavity and avoiding short circuit due to moisture, and in this embodiment the waterproof tie-in is the standard waterproof tie-in that can be bought in the market. The light beams from the bulbs cross in front of the main body, on one hand it increase irradiation area, on the other hand the faint unordered light is kept out by the opposite LED bulbs with great anti-vertiginous effect. Namely, it has great environmental friendly effect.

A second embodiment of this invention is also an environmental friendly LED street lamp. The difference is using a plurality of LED subarray plates instead of LED array plates. Each LED subarray plate is provided with a set of LED bulbs, and each LED subarray plate is connected to the obverse face of the base plate of the middle portion by fasteners. LED street lamp further comprises constant current power, which is set in the cavity formed by the main body and lampshade. The constant current power is set near the head portion including several sets of constant current device which can work separately. Each set of constant current device connects its output to the corresponding LED subarray by wire, and all sets of constant current device have one input connecting to the power supply. The surfaces of the radiating pins are provided with a plurality of raised radiating arris. As far as this embodiment is concerned, the area of radiation is extensible. The light beams from the bulbs cross in front of the main body, on one hand it increase irradiation area, on the other hand the faint unordered light is kept out by the opposite LED bulbs with great anti-vertiginous effect. Namely, it has great environmental friendly effect.

A third embodiment of this invention is also an environmental friendly LED street lamp comprising main body and LED bulbs. The main body comprises a base plate, which is assembled by a plurality of flat plates to shape like regular polygonal pyramid by cutting out pyramid apex. Each face of the regular polygonal pyramid is a flat plate, and a plurality of LED bulbs are provided on the inner side of the flat plate. The light beams from the bulbs cross in front of the main body, the mounting manner of the LED bulbs is similar to the second embodiment. The light beams from the bulbs cross in front of the main body, on one hand it increase irradiation area, on the other hand the faint unordered light is kept out by the opposite LED bulbs with great anti-vertiginous effect. Namely, it has great environmental friendly effect.

A forth embodiment of this invention is also an environmental friendly LED street lamp comprising main body and LED bulbs. The main body comprises a base plate shaping like beach umbrella. A plurality of LED bulbs are provided on the inner side of the base plate. The light beams from the bulbs cross in front of the main body, the mounting manner of the LED bulbs is similar to the $1^{st}$ embodiment, but the radiating plate and the transparent bottom plate are plates with bending face. The light beams from the bulbs cross in front of the main body, on one hand it increase irradiation area, on the other hand the faint unordered light is kept out by the opposite LED bulbs with great anti-vertiginous effect. Namely, it has great environmental friendly effect.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An environmental friendly light emitting diode street lamp comprising: a main body and a plurality of light emitting diode bulbs, wherein the main body comprises a base plate; said base plate comprises splay flat plates, namely the first flat plate and the second plate; the inner sides of the first flat plate and the second flat plate comprise sunk cavities where the light emitting diode bulbs are provided; and the light beams from the light emitting diode bulbs at the first flat plate and the second plate cross in front of the main body, wherein the main body comprises a head portion, a middle portion and a tail portion; said head portion and one side of said middle portion are connected butt and butt, and the opposite side of said middle portion and said tail portion are connected the same;

a first gasket is provided between the head portion and the middle portion, and the head portion and the middle portion are secured by fasteners;

a second gasket is provided between the tail portion and the middle portion, and the tail portion and the middle portion are secured by fasteners; the middle portion is profile with same section along the length direction of the middle portion; said profile comprises a base plate which consists of two flat plates and connecting plate between them; the two flat plates shapes to be splay together and are connected by the connecting plate; said base plate extends along the length direction of the profile with the inner face of said base plate as the obverse face and the outer face as the inverse; two parallel side plates extending along the length direction of the profile are provided at the two edges of the obverse face symmetrically, while the inverse is provided with a plurality of radiating pins extending along the length direction of the profile;

a tube of the head portion is constructed by a top part and a bottom part, which are secured by fasteners;

a wire hole in the head portion connects the tube and the joint face of head portion and the middle portion;

the light emitting diode street lamp further comprises two radiating plates on the obverse face of the splay flat plates separately; said radiating plates comprises printed circuit board for conductivity; and a plurality of light emitting diode bulbs are provided at the radiating plates to form light emitting diode array plates; the light emitting diode street lamp further comprises two insulating gaskets adhering to the radiating plates; and a plurality of holes are provided at the insulating gaskets for the light emitting diode bulbs; the insulating gaskets and the radiating plates are fastened to the obverse face of the base plate of the middle portion by fasteners; the two inner sides of the splay flat plate are both provided with a set of radiating plate and insulating gasket; and the light emitting diode street lamp further comprises a reflection shade adhering to the insulating gaskets; the reflection shade comprises a plurality of reflection notches with corresponding holes at the bottom of the reflection notches for light emitting diode bulbs; said light emitting diode bulbs are set in the reflection notches through the holes at the bottom of the reflection notches; the reflection shade is secured to the obverse face of the middle portion by fasteners; the reflection notches are provided in couple to shape as a splay, and this construction corresponds to the splay base plate; and the light emitting diode street lamp further comprises a lampshade comprising bottom plate and transparent lampshade, wherein the bottom plate is a rectangular plate with a rectangular hatch;

a rectangular gasket and a rectangular frame are provided in order to fix the lampshade plate to the bottom plate by fasteners; the head portion, the middle portion, the tail portion and the bottom plate are all made of thermal conductive material; and the wire hole is provided with a waterproof tie-in.

2. The environmental friendly light emitting diode street lamp according to claim 1, wherein the obverse side of the middle portion further comprises a couple of hook portion with their tips setting face to face, and each hook portion is set near the side plates separately; the section of the hook portion shapes as a letter "L" to comprise a horizontal part and a vertical part, wherein the horizontal part is longer than the vertical part; the head portion comprises a joint face comprising a step, wherein the convex part of the step butt into the inner side of the splay side plates of the middle portion, and the gasket is provided at the outer side of the step; similarly, the tail portion comprises a joint face comprising a step, wherein the convex part of the step butt into the inner side of the splay side plates of the middle portion, and the gasket is provided at the outer side of the step;

a plurality of radiating pins are set both on the top part of the head portion and the tail portion; the top part of the head portion and the tail portion are also provided with risers which have holes in them; the head portion and the tail portion are tightened by bolts which are set in the holes of the risers; the middle portion is connected to the head portion and tail portion with gaskets between them; said bolts are arranged in the clearance of the radiating pins on the top of the middle portion; the head portion and the middle portion are tightened by two screws which are set at the two side faces of the side plates; similarly, the tail portion and the middle portion are tightened by two screws which are set at the two side face of the side plates;

an antiskid is provided on the inner wall of the tube of the head portion axially; the notch in the middle portion is consist of first face, second face and third face, wherein the first face is parallel to third face, and the second face is vertical to the first face; the first face is near the inner side of the side plate, while the third face is near the outer side of the side plate;

the substantial part between the notch and the inner side of the side plate is first flange, while the part between the notch and the outer side of the side plate is second flange; the bottom face of the first flange is fourth face, and the bottom face of the second flange is fifth face; both of them are parallel to the second face, and the distance between the fourth face and the second face is shorter than the distance between the fifth face and the second face;

the radiating pins of the head portion, the middle portion and the tail portion are in the same direction with same section; the part of the radiating pins of the head portion away from the middle portion is vaulted; similarly, the part of the radiating pins of the tail portion away from the middle portion is vaulted too.

3. The environmental friendly light emitting diode street lamp according to claim 1, wherein light emitting diode array plate is composed of a plurality of light emitting diode subarray plates; each light emitting diode subarray plate is provided with a set of light emitting diode bulbs, and each light emitting diode subarray plate is connected to the obverse face of the base plate of the middle portion by fasteners.

4. The environmental friendly light emitting diode street lamp according to claim 3, wherein the light emitting diode street lamp further comprises a constant current power, which is set in the cavity formed by the main body and lampshade; said constant current power is set near the head portion including several sets of constant current devices which can work separately; and each set of constant current device connects its output to the corresponding light emitting diode subarray by wire, and all sets of constant current device have one input connecting to the power supply.

5. The environmental friendly light emitting diode street lamp according to claim 1, wherein:
the head portion and the tail portion are tightened by screws, which are set in the clearance of the radiating pings.

6. The environmental friendly light emitting diode street lamp according to claim 1, wherein:
the head portion and the tail portion are die-casting molded with aluminum alloy, the middle portion is aluminum profile or aluminum alloy profile;
the gaskets at the both sides of the middle portion, and the gasket between the lampshade and the main body are all made of heat conductive silicon gel.

7. The environmental friendly light emitting diode street lamp according to claim 1, wherein:
the surfaces of the radiating pins are provided with a plurality of raised radiating arris.

* * * * *